J. WALDHEIM.
TYPEWRITING MACHINE.
APPLICATION FILED OCT. 16, 1917.

1,339,078.

Patented May 4, 1920.
6 SHEETS—SHEET 1.

Witnesses:

Inventor:
John Waldheim
by D.C. Stickney
Attorney

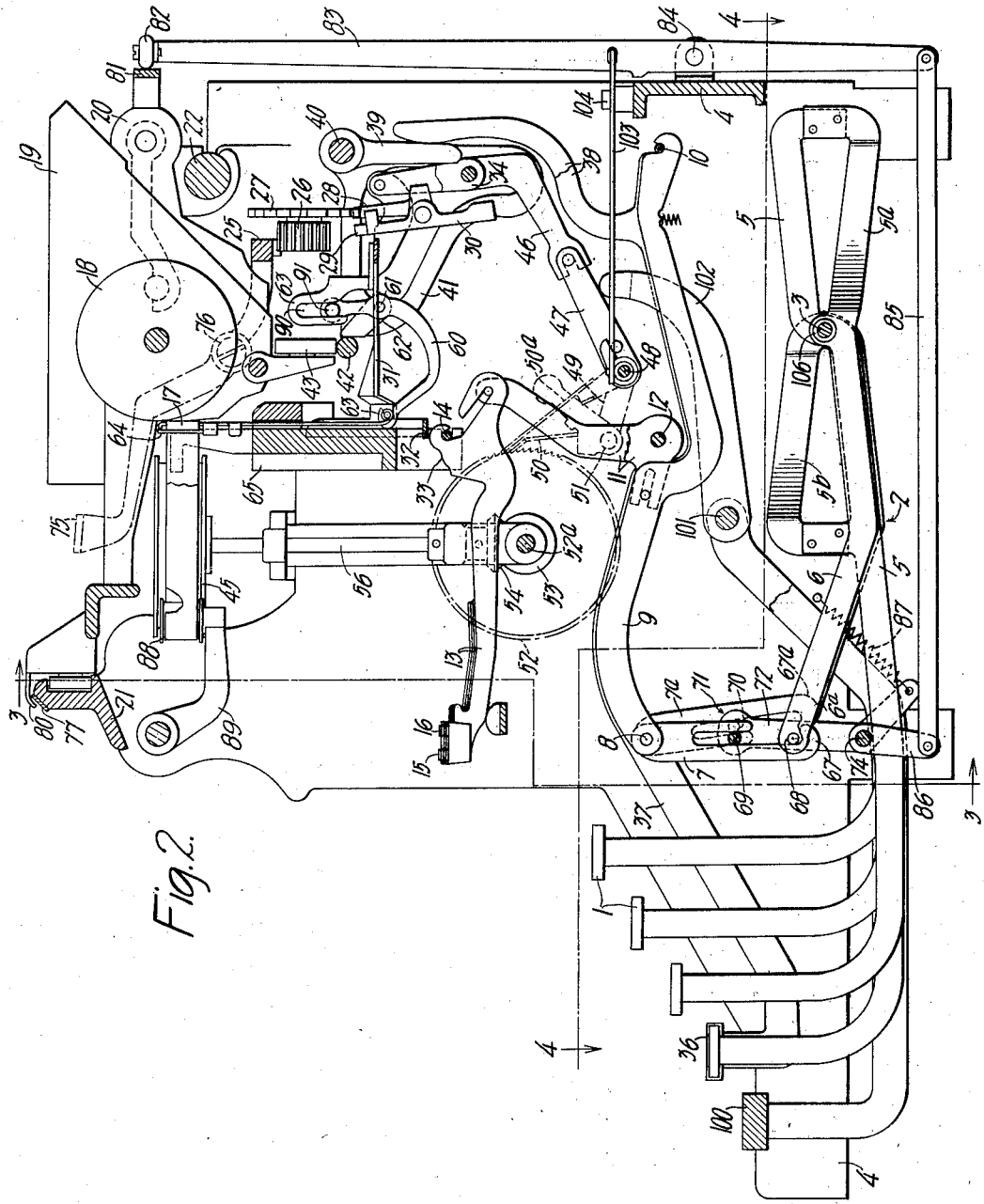

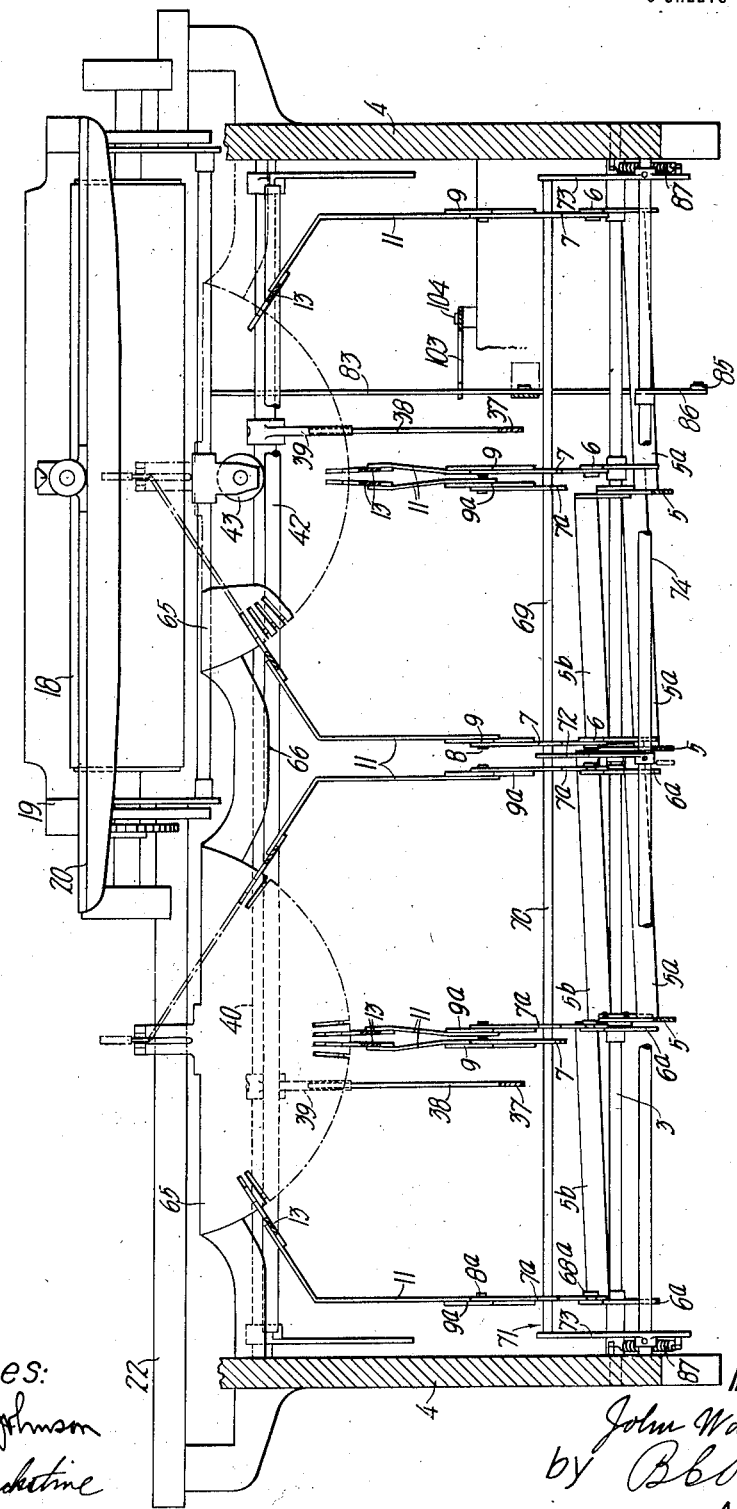

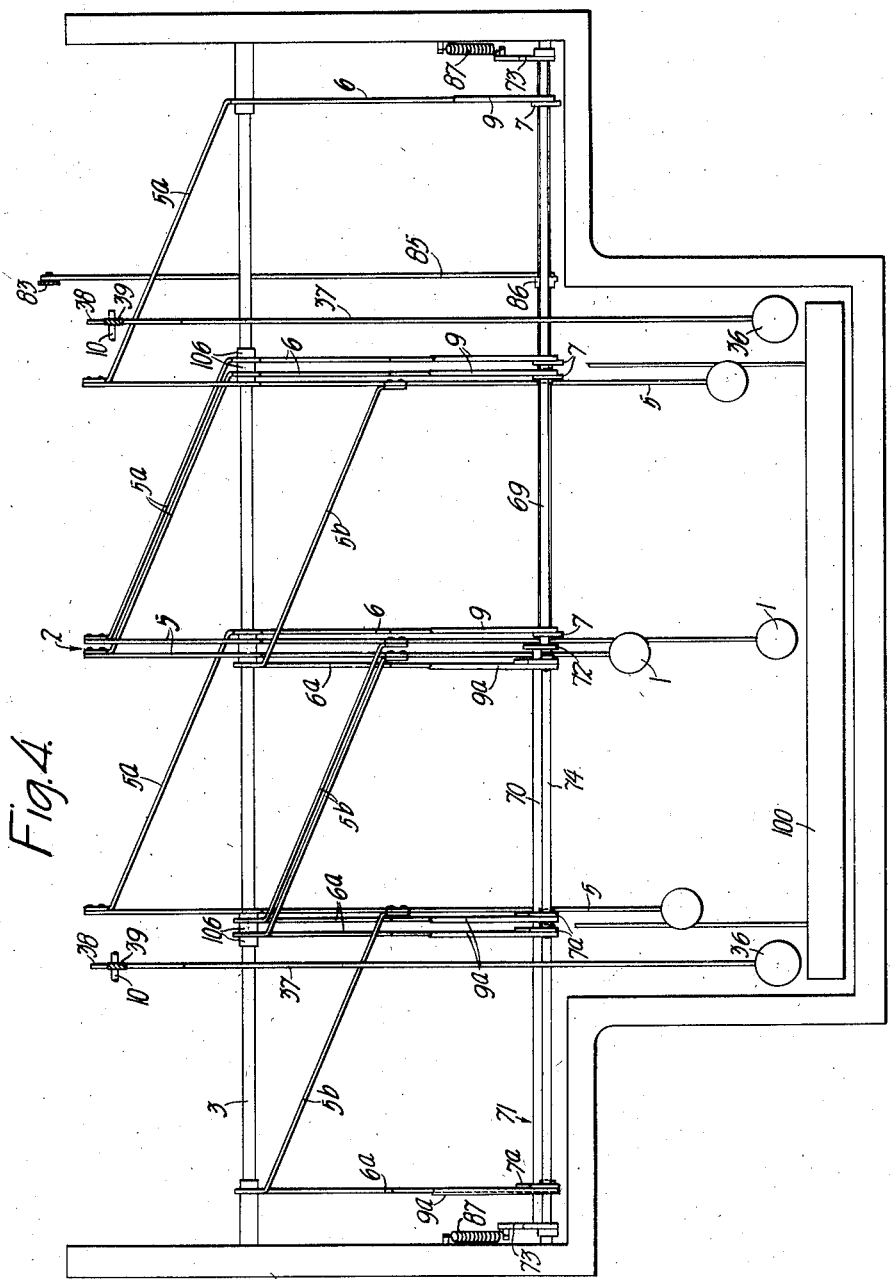

J. WALDHEIM.
TYPEWRITING MACHINE.
APPLICATION FILED OCT. 16, 1917.
1,339,078.
Patented May 4, 1920.
6 SHEETS—SHEET 5.
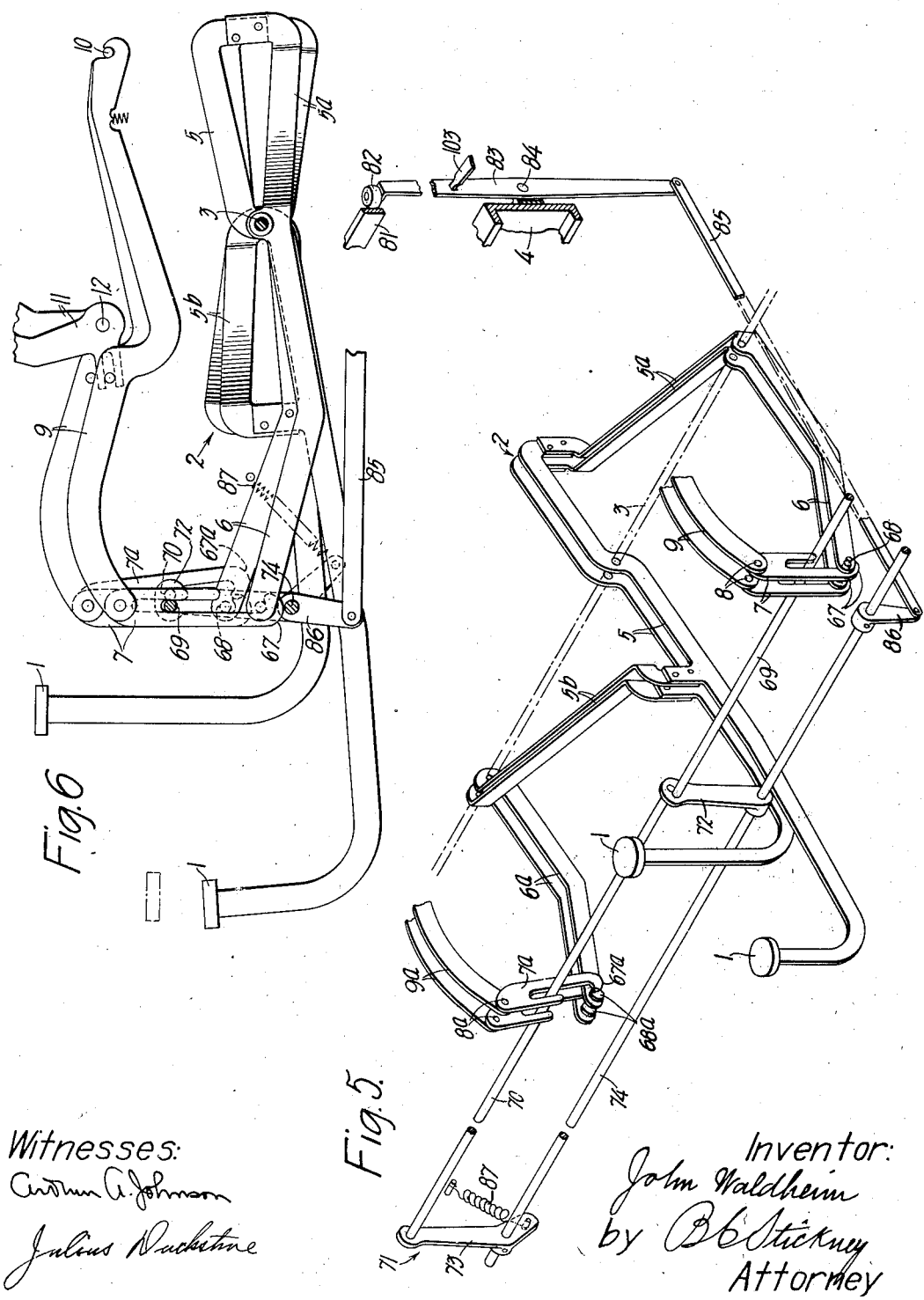
Witnesses:
Inventor:
John Waldheim
by B C Stickney
Attorney

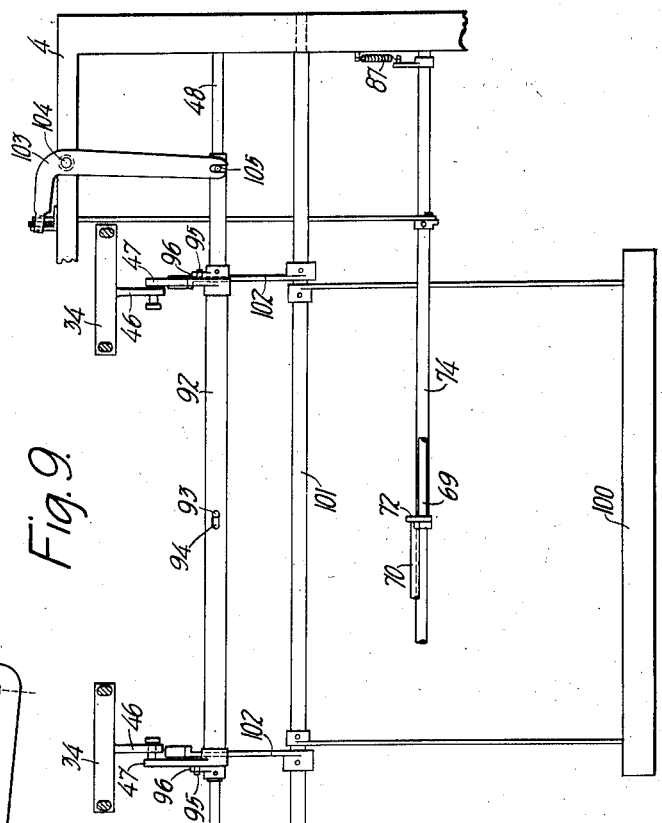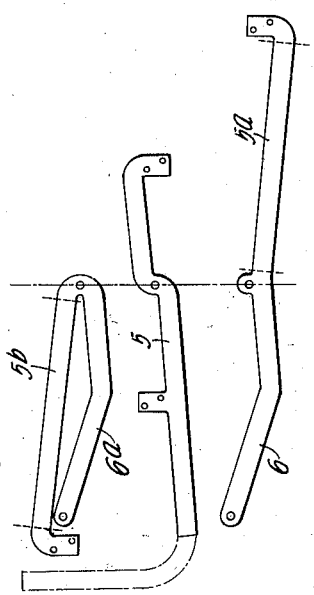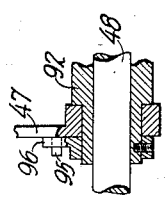

UNITED STATES PATENT OFFICE.

JOHN WALDHEIM, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING-MACHINE.

1,339,078.  Specification of Letters Patent.  Patented May 4, 1920.

Application filed October 16, 1917. Serial No. 196,797.

*To all whom it may concern:*

Be it known that I, JOHN WALDHEIM, a citizen of the United States, residing in Elizabeth, in the county of Union and State of New Jersey, have invented certain new and useful Improvements in Typewriting-Machines, of which the following is a specification.

My invention relates to typewriting machines, and more especially to the kind in which more than one type-set is used, to enable different kinds of printing on a single work-sheet, as for example, one style of type may be roman and the other italic. In machines of this type, usually two sets of type-bars and two keyboards are used; thus in using the machine it is necessary for the operator to become familiar with the use of two keyboards, and also to move his hands from one keyboard to the other.

One object of the invention is to simplify the operation of the machine, by making it unnecessary for the operator to familiarize himself with two keyboards. An additional object is to overcome the shifting of position. Both objects are attained by using a single keyboard. The position of the single keyboard may be kept constantly directly in front of the operator. A single set of keys is connected to actuate either set of type-bars.

As an additional feature, I have provided mechanism for automatically connecting the keys with either set of type-bars, preferably controlled from the typewriter carriage.

The keyboard may be centrally arranged and the keys may be mounted upon levers or frames, which are arranged under two sets of sub-levers that are associated with the two sets of type-bars. These nested frames have laterally-extending branches, and the latter have arms engaging with links or interponents, preferably carried by the sub-levers, so that when a key is depressed, movement is transferred from the key lever or frame through the interponent to the connected sub-lever, and through suitable connections to the type-bar to swing the latter to a printing position. There is provision for determining which set of type-bars shall be operated by the keys.

Each set of type-bars may have a separate escapement and a separate universal bar associated therewith, similar in construction to that of the regular Underwood typewriting machine.

A separate ribbon vibrator may also be provided for each set of type-bars, which may be actuated by the universal bar, as in the Underwood machine. The single set of keys, through the intermediary of the type-bars, may be effective to actuate either one of the universal bars, and consequently the escapement and ribbon vibrator associated therewith.

The case-shift mechanism may comprise a single swinging frame extending crosswise of the machine, and of a length to be effective to shift the platen when the latter is coöperating with either set of type-bars.

The inking ribbon may stretch from one spool to another and be threaded through both ribbon vibrators, and passes over a relatively fixed idler between the two vibrators. With this arrangement, either of the reaches of ribbon that extend oppositely from the idler to the ribbon spools may be vibrated independently of the other.

Some of the ribbon-feeding mechanism is similar to that used in Underwood machines. Since only one escapement is effective at a time, I have found it advantageous to render the control of the ribbon-feed under either escapement automatic. This is done preferably by the typewriter carriage.

The space-bar is automatically rendered effective to engage with either one of the escapements. This is also controlled by the typewriter carriage.

I have illustrated the invention in connection with an Underwood typewriting machine, but it should be understood that it may readily be employed with other typewriting mechanisms. Some of the features may also be used in machines in which two keyboards are provided, and in machines in which other relative shift is provided between the single keyboard and the plurality of sets of type-bars.

Other features and advantages will hereinafter appear.

In the accompanying drawings,

Figure 1 is a top plan view of the machine, showing the relative arrangement of the two sets of type-bars and a single set of keys; also the rail on the typewriter carriage, which coöperates with suitable mechanism to cause the connection of the keys with either set of type-bars. A single ribbon is shown which is threaded through two ribbon vibrators and passes over an idler located near the center of the machine and between the vibrators.

Fig. 2 is a sectional side view, taken substantially on the line 2—2 of Fig. 1, and looking in the direction of the arrows at said lines.

Fig. 3 is a sectional front view, taken on the line 3—3 of Fig. 2, and showing the arrangement of two type-sets and the mechanism for actuating them.

Fig. 4 is a sectional top plan view, taken on the line 4—4 of Fig. 2, showing the connections from the keys to the two sets of sub-levers, and also some of the mechanism for changing said connections.

Fig. 5 is a perspective view, showing two adjacent keys located in the center of the machine, with two sub-levers of each set associated therewith, and the bail controlled from the typewriter carriage which connects and disconnects the keys with either set of sub-levers. This view also shows the nested arrangement of the key levers.

Fig. 6 is a side view of the mechanism shown in Fig. 5, and shows one of the keys in its depressed or actuated position.

Fig. 7 is a view showing the development of the parts comprising the key lever, before they are bent and assembled.

Fig. 8 shows a type-bar of each type-set with the different kinds of types thereon.

Fig. 9 is a fragmentary top plan view, showing the space-bar, ribbon-feed shaft, portions of two rocking frames of the escapements, and the means for rendering the space-bar and the ribbon-feeding mechanism under the control of either escapement simultaneously with the changing of the key connections.

Fig. 10 is an enlarged detail sectional view, showing how the interponents may be mounted on the sliding sleeve of Fig. 9.

Figure 1:
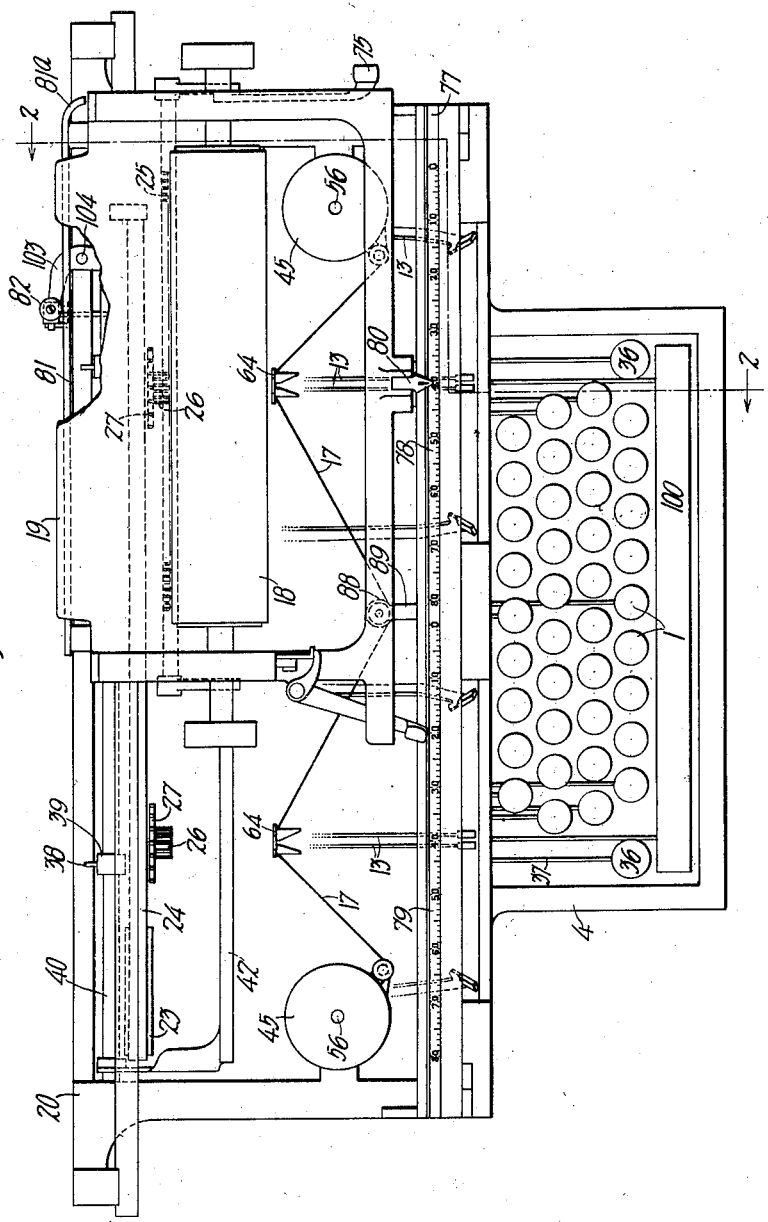

Character keys 1, when depressed, actuate key levers or pivoted frames 2 to swing about a fulcrum rod 3, supported on the machine frame 4. Each key lever comprises an intermediate or body portion 5 having a rightwardly-extending branch $5^a$ and a leftwardly-extending branch $5^b$. The outer ends of the branches $5^a$ and $5^b$ have forwardly-projecting arms 6 and $6^a$, respectively, which, during the depression of the keys 1, may engage with connectible links or pendants 7 and $7^a$, which may be conveniently guided. The links 7 and $7^a$ are pivotally mounted at 8 and $8^a$, preferably on sub-levers 9 and $9^a$ and are effective to swing the latter about a fulcrum 10. The sub-levers, when actuated, swing bell cranks 11 about their fulcrums 12 to swing type-bars 13 about a fulcrum 14, and cause upper and lower-case types 15 and 16 to print, through a ribbon 17, against a rotatable platen 18. The platen is supported in a platen frame 19, mounted and guided for case-shifting movements in a carriage frame 20, in a manner similar to that of the Underwood machine.

The carriage 20 is mounted for traveling movements on a front rail 21 and a rear rail 22, and is drawn from right to left of the machine, during letter-feeding movements, by a spring drum 23, connected to the carriage by a strap 24, (Fig. 1).

Letter-feeding movements of the carriage are controlled by either one of two escapements, only one being effective at a time. During these letter-feeding movements, a rack 25, pivotally supported on the carriage 20, engages with a pinion 26 to rotate an escapement wheel 27 through the intermediary of the usual one-way acting pawls (not shown). The movements of the escapement wheels 27 are controlled by a loose and a fixed dog 28 and 29, respectively, mounted on a dog rocker 30, which is vibrated by a floating frame 31 with the assistance of suitable return springs (not shown). The floating frame 31 has at its forward end a curved universal bar 32, with which heels 33 of the type-bars 13 engage during the latter part of the upward movement of the type-bars, thus imparting movement to the floating frame to reciprocate the dogs between the escapement wheel. The rear end of the floating frame 31 may be guided by a swinging frame 34.

The platen 18 may be shifted from lower to upper-case position by the depression of either one of two shift keys 36 arranged in the keyboard. Each key, when depressed, swings a lever 37 about the fulcrum 10 to cause an upwardly-extending arm 38 to engage with an arm 39 projecting downwardly from a shaft 40, forming part of a shift frame 41. Thus the shift frame is actuated to swing upwardly a cross bar or shift rail 42, forming the forward part of the said shift frame, to move the platen from its lower to its upper-case position by the intermediary of a roller 43, which is supported in a suitable manner on the platen frame, and rolls back and forth on the shift rail 42, during movements of the carriage. A suitable lock may be provided to hold the platen in its shifted position.

The ribbon 17 is fed from one to another of two spools 45 by means of an arm 46, extending downwardly from the rocking frame 34 associated with the escapement mechanism, which engages with an arm or interponent 47, of which there are two, and both of them slidably mounted on a shaft 48, for a purpose which will hereinafter be more clearly described. The arm 47 rocks the shaft 48 to vibrate an arm 49 secured to one side of the shaft, and having a pawl 50 pivoted on a stud 51. The pivoted pawl in its vibratory movements, due to arm 49, engages with a ratchet wheel 52 and, with the assistance of a holding pawl 50ª, imparts fractional rotations to a horizontally-disposed shaft 52ª to which said ratchet wheel is secured. A suitable spring (not shown) may be interposed between the pawls 50 and 50ª to hold them against the ratchet wheel. The shaft 52ª is provided with gear wheels 53, which may engage with gear wheels 54 to drive any one of two vertical shafts 56, having the ribbon spools 45 conveniently mounted at their upper ends. The shaft 52ª is slidable lengthwise, so that it may be connected by means of one set of gear wheels 53 and 54 to either one of the vertical shafts in driving relation therewith.

The ribbon is vibrated so as to expose it to the printing types by a lever 60, pivoted at 61 on a bracket 62 extending from the shift rail 42. The lever 60 is actuated by a hook-shaped extension 63, secured to the floating frame 31, and swings the lever 60 to move upwardly a ribbon vibrator or guide 64 carried by the forward end thereof, thus exposing the ribbon 17 to the printing types.

By an inspection of Fig. 3, it will be seen that there are two type-sets arranged side by side, each comprising a set of type-bars 13. Two type-bar segments 65 are provided, upon which the type-bars are pivotally mounted. The segments are secured to a cross bar 66 extending from one side to the other of the machine frame 4, and may be secured thereto in any convenient manner. Each set of type-bars has a set of sub-levers and a set of bell cranks associated therewith, which are used to throw the type-bars to their printing positions, as hereinbefore described.

The sub-levers 9 and 9ª of each set have links 7 and 7ª, respectively, pivoted at their forward ends, and the links are hook-shaped at their lower ends 67 and 67ª, so that they may engage with studs 68 and 68ª carried by the forward arms 6 and 6ª, respectively, of the key levers 2. The links 7 and 7ª are slotted so as to straddle the cross rods 69 and 70, respectively, of a bail 71, the cross rods extending between a central portion 72 and end portions 73, secured to a rock shaft 74, which is pivotally supported on the machine frame 4.

It will be seen by an inspection of Figs. 2 and 5 that the links 7 and 7ª are similar in construction, but are reversely mounted on their respective sub-levers 9 and 9ª, or, in other words, the hook portions 67 and 67ª extend in opposite directions. Thus it will be seen that when the upper portion of the bail 71 is thrown forwardly, which movement is preferably controlled by the typewriter carriage and which will be hereinafter more clearly described, the links 7 become disconnected, while the links 7ª become connected with the key levers 2 by engaging with the studs 68ª of the arms 6ª.

To move the carriage so as to bring the platen 18 into coöperative relation with either type-set, there is provided a carriage release handle 75, which, when actuated, swings about a pivot 76 to raise the rack 25 out of engagement with the pinion 26. The carriage is then moved to the proper position relatively to the desired type-set. To assist in locating the carriage relatively to the desired type-set, there is provided a scale plate 77, having similar scales 78 and 79 thereon, one scale being associated with each type-set. Before the carriage is moved from one type-set to another, a reading of the scale is taken with the assistance of a pointer 80, secured to the typewriter carriage 20. The carriage is then released by the handle 75, which disengages the feed rack 25 from the pinion 26, after which the carriage is moved to the other type-set and positioned by means of the scale and pointer according to the reading previously taken.

The connecting of the keys with either type-set is preferably accomplished automatically, and is advantageously controlled by a rail or bar 81, secured in any convenient manner to the typewriter carriage 20. When the platen is in coöperative relation with the type-set at the right-hand side of the machine (Fig. 1), the rail 81 engages with a roller 82 mounted to rotate on the upper end of a lever 83, pivoted at 84 at the rear of the machine frame 4. The lower end of the lever 83, through the intermediary of a link 85, is connected to an arm 86, extending downwardly from the rock shaft 74 of the bail 71. Thus, the cross rods 69 and 70 of the bail 71 are held in their rearmost positions against the tension of springs 87 (Figs. 2 and 4), by the rail 81 on the typewriter carriage.

It will be seen that the typewriter carriage may travel back and forth while a work-sheet is being written on by the type-set at the right-hand side of the machine, during which time the rail 81 will move with the carriage and the roller 82 will roll idly thereon.

The connection of the keys is changed when the platen is moved from the type-set at the right-hand side of the machine into coöperative relation with the type-set on the left-hand side of the machine. The rail 81 on the typewriter carriage and the roller 82 are so positioned relatively to each other that they will be disengaged when the platen is moved to the first letter-space position of the type-set at the left-hand side of the machine. When this is done, the springs 87 become effective to swing the bail 71, thus carrying the cross rods 69 and 70 thereof to their forward positions. During this movement of the bail 71, the hooks 67 of the links 7 are taken out of effective relation with the studs 68, thus breaking the connection between the key-levers and the type-set at the right-hand side of the machine. At the same time the hooks 67ª of the links 7ª are brought into effective relation with the studs 68ª, to connect the keys with the type-set at the left-hand side of the machine. If, however, the platen is in effective relation with the type-set at the left-hand side of the machine, and it is desired to move said platen into effective relation with said type-set at the right-hand side of the machine, a cam portion 81ª (Fig. 1) of the rail 81 on the typewriter carriage engages with the roller 82 to move the upper end of the lever 83 rearwardly, thus swinging the latter about its pivot, and by means of the link 85 swings the bail 71 so as to connect the right-hand type-set and disconnect the left-hand type-set with the keys. Thus it will be understood that the bail 71 is controlled from the typewriter carriage, that the spring 87 is effective to move the bail in one direction, that the effectiveness of said spring is dependent upon the typewriter carriage, and that the typewriter carriage is effective to swing said bail in a reverse direction from said spring.

Each type-set is provided with a separate escapement, comprising a pinion 26, an escapement wheel 27 and a set of dogs 28 and 29 on the dog rockers 30. Each escapement has a separate floating frame 31, provided with a universal bar 32, as hereinbefore described.

It will be seen (Fig. 1) that the rack 25 is a little shorter than the distance between the two escapement pinions 26; this is done to cause the rack 25 to engage with only one of the pinions 26 at a time. Thus it will be understood that only one escapement may be effective at a time, and either escapement may be rendered effective by moving the carriage to cause the feed rack 25 to engage with either pinion and at the same time change the connection of the keys so that they, when actuated, cause connected type-bars to operate the universal bar associated with the escapement with which the feed rack is being connected.

There are two ribbon vibrators 64, one for each type-set. These ribbon vibrators are arranged at different positions lengthwise of the ribbon 17 and operate the latter, which passes from one spool 45 to a vibrator 64 associated with one type-set, then over an idler 88, rotatably mounted on a fixed bracket 89 in the center of the machine. The ribbon passes from the idler 88 to another ribbon vibrator 64 associated with the other type-set, and then to the other spool 45. It will be seen that the ribbon is fed in a substantially horizontal path.

Each portion of the ribbon 17 between the idler 88 and the ribbon spools 45 may be raised by the vibrator 64, associated therewith, without disturbing the portion of the ribbon associated with the other vibrator. It will be remembered that each set of type-bars has a floating frame 31, comprising a universal bar 32 associated therewith. Each floating frame has a hook portion 63 engaging with a lever 60 to vibrate a ribbon vibrator 64, as hereinbefore described. Thus, each ribbon vibrator 64 may be rendered effective or ineffective, which may be controlled by the typewriter carriage by connecting or disconnecting the type-bars with the keys.

To maintain the same relative position between the ribbon vibrator and the platen in both lower and upper-case positions of the platen, the levers 60 associated with the ribbon vibrators 64 are pivotally mounted on the shift rail 42, and the hook portions 63 have elongated slots 90, into which studs 91 of the levers 60 project. Thus, when the shift frame 41 is swung about its pivot 40, the shift rail 42 will be moved upwardly to carry the lever 60 therewith. The levers 60 are guided in their upward movements by the pins 91 engaging in the slots 90, and move practically parallel with themselves to move the ribbon vibrator through a distance substantially equal to that through which the shift rail 42 is moved.

The ribbon-feeding mechanism may be placed under the control of either escapement, by moving the platen from one type-set to another. The escapements have swinging frames 34 comprising downwardly-extending arms, as hereinbefore described. These arms engage with the interponents 47 which are loosely mounted on a sleeve 92. The sleeve 92 is keyed to the shaft 48, for a purpose which will presently be described, by a pin 93 on said shaft extending into a slot 94 in the sleeve 92. Each interponent has a pin 95 extending therefrom and engaging with a finger 96 secured to the sleeve 92 to rock the shaft 48 in a counter-clockwise direction. It will be seen that when either escapement is effective, take, for example, the one on the right-hand side of the machine, as shown in Fig. 9, the downwardly-extending arm 46, when actuated, will engage with its associated interponent 47 to swing the latter in a counter-clockwise direction. The underlying pin 95 will thus engage with the finger 96 to rotate the sleeve 92 in the same direction. This rotary movement may be transferred from the sleeve to the ribbon-feed shaft 48, by means of the pin 93 extending from the shaft 48 and engaging in the slot 94 in the sleeve 92. It will also be seen that the arm 47 associated with the idle escapement will remain undisturbed, the finger 96 associated therewith moving away from the pin 95 on said arm 47. The ribbon-feeding mechanism may be actuated in a similar way by the escapement associated with the type-set at the left-hand side of the machine, during which time the interponent associated with the escapement at the right-hand side of the machine may remain undisturbed.

A space bar 100, when actuated, rocks a shaft 101, pivotally supported in the machine frame 4. The rock shaft 101 has extending rearwardly therefrom two arms 102, which may engage with the interponents 47. Only one of the arms 102 is effective at a time to engage with the interponent 47 associated therewith, and through the intermediary of the arm 46 to rock the swinging frame 34 and actuate the escapement mechanism by means of the floating frame 31.

The space bar 100 may be rendered effective to actuate either one of said escapements. This may be controlled from the typewriter carriage by a bell crank 103, pivotally mounted on a stud 104 on the machine frame 4 and having a reduced portion at its rearward end extending into a slot in lever 83. When the carriage moves from the right to the left-hand type-set, the forward end of the bell crank 103, which is connected to the sleeve 92 by a pin and slot at 105, moves rightwardly to slide the sleeve 92 therewith on the ribbon-feed shaft 48. Thus, the interponent 47 mounted at the right-hand side of the machine moves out of effective relation with the arm 102 (Fig. 9) associated therewith, while the one at the left-hand side of the machine is at the same time brought into effective relation with its associated arm 102. The pin 93 projecting from the ribbon-feed shaft extends into the slot 94 in the sleeve 92 for the purpose of maintaining a direct connection between the shaft and sleeve in their rotary direction and to permit a relative sliding movement lengthwise thereof.

All of the key levers 2 (Figs. 2, 4, 5 and 7) may be exactly alike. The key stems, which have the keys 1 mounted at their upper ends, may be secured to the intermediate portions 5 of the key levers in any convenient manner, but, for the sake of simplicity, I have shown them as one piece. Each key lever may be composed of three sections, as indicated in Fig. 7, which shows the parts after they are stamped. The short dotted lines in said figure indicate the places at which the parts are bent to form the shapes shown in Fig. 5, which shows the parts assembled and preferably riveted together. Each key lever takes a bearing at the outer ends of the branches 5ª and 5ᵇ on the fulcrum rod 3. The holes in the central portions 5 may be larger than the diameter of the fulcrum rod 3, so as to avoid any possible binding of the key lever on the fulcrum rod, which may be caused by the inaccurate alinement of the holes in the two branches 5ª and 5ᵇ with that of the intermediate portion 5. It will be seen that with this construction of the key levers, motion may be transmitted from the keys to either set of sub-levers without causing any torsional strains on the moving parts. Also they may be conveniently nested so as to occupy a minimum space. The key levers may be held in position on the fulcrum rod 3 by suitable spacing washers or collars 106. The branches 5ª and 5ᵇ of the key levers 2 underlie and overlie, respectively, the portions 5. These branches 5ª and 5ᵇ are far enough removed from the intermediate portions 5 so as not to collide with the intermediate portions of the key levers when a key lever is actuated, as indicated in Fig. 6.

Variations may be resorted to within the scope of the invention, and portions of the improvements may be used without others.

Having thus described my invention, I claim:

1. In a typewriting machine, the combination of a plurality of type-sets of different kinds of print, each set including type-bars carrying upper and lower-case characters, a single set of keys, and means for connecting each key of said set of keys with the corresponding type-bar of any one of said type-sets.

2. In a typewriting machine, the combination of a plurality of type-sets of different kinds of print, each set including type-bars carrying upper and lower-case characters, a single set of keys, and mechanism whereby each key of said single set of keys may be operatively connected with the corresponding type-bar of any one of said type-sets, one set at a time.

3. In a typewriting machine, in combination, a platen, a plurality of type-sets having separate printing points, a single set of keys, and means for connecting said set of keys with any one of said type-sets.

4. In a typewriting machine, the combination with a carriage comprising a platen, of two sets of type-bars carrying upper and lower-case characters, said sets being arranged side by side, a single set of keys, and means for operatively connecting said single set of keys with said sets of type-bars, one set at a time.

5. In a typewriting machine, the combination with a platen, of a plurality of type-sets, each set including type-bars carrying upper and lower-case characters, and a set of intermediate levers, a single set of keys, and means for connecting said keys to any set of intermediate levers.

6. In a typewriting machine, the combination with a platen, of a plurality of type-sets, each set including type-bars carrying upper and lower-case characters, and a set of intermediate levers, a single set of keys, interponents, and means engaging with said interponents to connect and disconnect said keys and said intermediate levers.

7. In a typewriting machine, the combination with a platen, of a plurality of type-sets, of intermediate levers, a single set of keys, links, and a bail engaging with said links to connect and disconnect said keys and said intermediate levers.

8. In a typewriting machine, the combination with a platen, of a plurality of type-sets, each set comprising a plurality of type bars carrying upper and lower-case types, a single set of keys, and means for connecting said set of keys with any one of said type-sets.

9. In a typewriting machine, the combination of a plurality of sets of type-bars, each set carrying upper and lower-case characters, a single set of keys, a plurality of type bars being associated with each key, sets of sub-levers operatively connected with the respective sets of type bars, means for connecting said keys and sub-levers, and means for changing said connecting means to render any one of the type-bars, associated with a key, effective to be actuated by the latter.

10. In a typewriting machine, the combination with a plurality of type-sets, of a single set of keys, key-actuated means for actuating any of said type-sets, mechanism tending to render said key-actuated means ineffective with respect to one of said type-sets, and effective with respect to another, and means including a carriage for controlling said mechanism.

11. In a typewriting machine, the combination with a carriage, of a plurality of type-sets, one set being effective at a time, and carriage-controlled means for determining which of said type-sets shall be effective.

12. In a typewriting machine, the combination with a carriage, of a plurality of type-sets, a single set of keys, and means controlled from the carriage for connecting the set of keys with any one of said type-sets.

13. In a typewriting machine, the combination with a carriage comprising a platen, of a plurality of type-sets, a single set of keys, and means actuated by a movement of said carriage from one type-set to another for connecting said keys with the type-set to which the platen is moved.

14. In a typewriting machine, the combination with a carriage comprising a platen, of a plurality of type-sets, a single set of keys, and means actuated by a relative movement between said platen and said type-sets to connect said keys with any one of said type-sets.

15. In a typewriting machine, the combination with a platen, of a plurality of type-sets, a single set of keys, and means caused by a relative movement transverse with respect to the machine between said type-sets and said platen to establish an effective relation between said keys and any one of said type-sets.

16. In a typewriting machine, the combination with a carriage comprising a platen, of a plurality of type-sets arranged side by side, and a single set of keys, there being a relative lateral movement between said type-sets and said platen to cause an effective relation of said keys with any one of said type-sets.

17. In a typewriting machine, the combination of a plurality of sets of type-bars, each type-bar carrying an upper-case and a lower-case character, a single set of keys, type bar actuating means including sub-levers, connections comprising links between said keys and said sub-levers, a bail associated with said links, and means for shifting said bail to change the connections between said keys and said sub-levers by rendering each of said links effective or ineffective.

18. In a typewriting machine, the combination with a carriage, of a plurality of type-sets, a single set of keys, sub-levers, connections comprising links between said keys and said sub-levers, a bail associated with said links, and means for shifting said bail to change the connections between said sub-levers and said keys, said means comprising a rail on said carriage engaging with a lever connected to said bail.

19. In a typewriting machine, the combination of two type-sets side by side transversely of the machine, a single set of key-levers, and means, including a spring, to disconnect said key-levers from one type-set and connect them with the other type-set.

20. In a typewriting machine, the combination with a carriage, of two type-sets, actuating means therefor including a single set of keys, means, including a spring, to disconnect said keys from one type-set and connect them with the other type-set, and carriage controlled means for determining the effectiveness of said spring.

21. In a typewriting machine, the combination with a carriage, of two type-sets, actuating means therefor including a single set of keys, means to disconnect said keys from one type-set and connect them with the other type-set, and carriage-controlled means to reverse the action of said disconnecting and connecting means.

22. In a typewriting machine, the combination of two type-sets arranged side by side, a single set of key-levers, each type-set having a set of sub-levers, there being two sub-levers, one in each set, for each key-lever, and means for selectively connecting the sub-levers to the key-lever with which they are associated.

23. In a typewriting machine, the combination of two type-sets arranged side by side, a single set of key-levers, each type-set having a set of sub-levers, there being two sub-levers for each key-lever, and means for selectively connecting the sub-levers to the key-lever with which they are associated, each key-lever having branches extending laterally therefrom, and each branch having an arm extending parallel with the key-lever, the connection between the key-lever and its corresponding sub-levers being made at the ends of said arms.

24. In a typewriting machine, the combination of two type-sets arranged side by side, type-set actuating means including a single set of key-levers, each type-set having a set of sub-levers, two for each key-lever, and means for selectively connecting the sub-levers to the key-lever with which they are associated, comprising branches extending laterally from each key-lever, each branch having an arm extending parallel with the key-lever, pendants on said sub-levers, and means for swinging said pendants to alternatively connect the branches of each key-lever with the sub-levers associated therewith.

25. In a typewriting machine, the combination of two type-sets, a single set of keys, two sets of sub-levers, one for each type-set, two sets of pivoted interponents, the interponents of one set being reversely mounted relatively to the interponents of the other set, a bail engaging with said interponents, and means for swinging said bail to change the position of said interponents, thereby connecting the keys with one set of sub-levers and disconnecting the keys from the other set of sub-levers.

26. In a typewriting machine, the combination of two type-sets, each having a set of intermediate levers associated therewith, a single set of key-levers, said key-levers having branches projecting laterally therefrom, each set of branches having a set of arms extending parallel with said key-levers, and each set of arms being associated with one of said sets of intermediate levers, and means for connecting said intermediate levers to said arms.

27. In a typewriting machine, the combination of two type-sets, each having a set of sub-levers associated therewith, a single set of key-levers, each key-lever having two branches projecting laterally therefrom, the branches forming two sets, each set of branches having a set of arms extending parallel with said key-levers, and each set of arms being associated with one of said sets of sub-levers, and means for connecting said sub-levers to said arms.

28. In a typewriting machine, the combination of a carriage, two type-sets, each having a set of sub-levers associated therewith, a single set of key-levers, said key-levers having branches projecting laterally therefrom, each set of branches having a set of arms extending parallel with said key-levers, and each set of arms underlying one of said sets of sub-levers, pendants on said sub-levers, and means controlled from said carriage for connecting either set of pendants with said key-levers.

29. In a typewriting machine, the combination of two type-sets, each having a set of sub-levers associated therewith, a single set of key-levers, said key-levers having two sets of arms, two sets of links, and means adapted to control said links to connect either set of sub-levers with said key-levers.

30. In a typewriting machine, the combination of a plurality of type-sets having type-bars, key-levers, each having a plurality of branches, connections whereby each branch may be effective to actuate a type-bar in a different set, and means to render ineffective the connection between any branch and the corresponding type-bar.

31. In a typewriting machine, the combination of a plurality of type-sets having type-bars, and means for actuating said type-bars, said means comprising a set of frames, of the same form and size, each frame extending from one type-set to another and having a broad bearing, and a plurality of type-bars connectible to each frame.

32. In a typewriting machine, in combination, a platen, a plurality of type-sets arranged side by side, each of said type-sets having a separate printing point, a single set of keys, and means whereby said set of keys may be made effective to operate any one of said type-sets.

33. In a typewriting machine comprising type-bars, means for actuating said type-bars, said means comprising intermediate levers, and a single set of keys, said keys having two sets of arms associated therewith, each arm and an intermediate lever moving in the same plane, said arm and said lever being connected to each other.

34. In a typewriting machine comprising type-bars, means for actuating said type-bars, said means comprising intermediate levers, a single set of keys, said keys having two sets of arms associated therewith, each arm and an intermediate lever moving in the same plane, pivoted links on said levers, and means for connecting or disconnecting said links with said arms.

35. In a typewriting machine comprising type-bars, means for actuating said type-bars, said means comprising a set of levers, said levers having intermediate portions, two sets of branches extending from said intermediate portions, one of said sets extending over some of said intermediate portions, the other set of branches extending under some of said intermediate portions, and arms extending from said branches, each arm being associated with a type-bar.

36. In a typewriting machine having two sets of type-bars arranged side by side, a single set of key-operated levers, said levers having body portions, two sets of branches extending laterally therefrom and in opposite directions, the two branches extending from each body portion forming bearings at their ends, and arms extending from said branches, said arms being connectible to said type-bars.

37. In a typewriting machine having different writing points, the combination with a platen, a ribbon and a ribbon-feeding mechanism comprising two spools, of a plurality of ribbon vibrators arranged at different writing points lengthwise of said ribbon, said ribbon passing from one spool to said vibrators and back to the other spool.

38. In a typewriting machine, the combination with a platen and a ribbon, of a plurality of type-sets, a plurality of ribbon vibrators, one for each type-set, said ribbon passing from one to the other of said vibrators, and means for actuating said vibrators individually.

39. In a typewriting machine, the combination with a platen, a ribbon and a ribbon-feeding mechanism comprising two spools, of two type-sets, two ribbon vibrators, one for each type-set, and an idler between said ribbon vibrators, said ribbon passing from one spool to a vibrator, from the latter to said idler, from said idler to the other ribbon vibrator, and then to the other spool.

40. In a typewriting machine, the combination with a platen, a ribbon and a ribbon-feeding mechanism comprising two spools for feeding said ribbon in a substantially horizontal path, of a plurality of ribbon vibrators, to which the ribbon passes in succession in traveling from one spool to the other, and separate devices to actuate said ribbon-vibrators.

41. In a typewriting machine, the combination with a platen, a ribbon and a ribbon-feeding mechanism comprising two spools for feeding said ribbon in a substantially horizontal path, of two ribbon-vibrators associated with the ribbon at different points between said spools, an idler between said vibrators to assist in guiding said ribbon from one vibrator to another, and means to operate said vibrators independently.

42. In a typewriting machine, the combination with a platen, a ribbon and a ribbon-feeding mechanism comprising two spools, of two ribbon vibrators, and an idler fixed relatively to said vibrators, said ribbon extending from said spools to said vibrators and over said idler.

43. In a typewriting machine, the combination with a carriage, of a plurality of type-sets, and a ribbon vibrator for each set, one set and one ribbon vibrator being effective at a time, the effective set and effective ribbon vibrator being dependent upon the position of the carriage.

44. In a typewriting machine, the combination of a plurality of type-sets, a plurality of ribbon vibrators, one for each type-set, a single set of keys, and means for connecting said set of keys with any one of said type-sets, said keys being adapted to actuate any one of said ribbon vibrators.

45. In a typewriting machine, the combination with a carriage, of a plurality of type-sets, a plurality of ribbon vibrators, one for each type-set, a single set of keys, and means controlled from said carriage for connecting said set of keys with any one of said type-sets, said keys being adapted to actuate, in each instance, the ribbon vibrator associated with the connected type-set.

46. In a typewriting machine, the combination with a carriage, of a plurality of type-sets, each set having an escapement and a ribbon vibrator associated therewith, one type-set, one escapement and one ribbon vibrator being effective at a time, the effective set of types, escapement and ribbon vibrator being dependent upon the position of the carriage.

47. In a typewriting machine, the combination with a carriage, of a plurality of type-sets, each set having an escapement and a ribbon vibrator associated therewith, a single set of keys, and means controlled from the carriage for connecting the set of keys with any one of said type-sets, said keys being adapted to actuate said escapements and said ribbon vibrators.

48. In a typewriting machine, the combination with a carriage, of a plurality of sets of type-bars, a universal bar associated with each set of type-bars, a ribbon vibrator connected to each universal bar, an escapement associated with each universal bar, a single set of keys, and means for connecting said set of keys with any set of type-bars, said keys being adapted to actuate, in each instance, the universal bar associated with the connected type-bars.

49. In a typewriting machine, the combination with a carriage, of a plurality of type-sets, a universal bar for each type-set, an escapement and a ribbon vibrator associated with each universal bar, and a single set of keys, said carriage being adapted to connect said set of keys with any one of said type-sets, said keys being effective to actuate the universal bar, escapement and ribbon vibrator associated with the connected type-set.

50. In a typewriting machine, the combination with a carriage, of a single set of keys, a plurality of carriage escapements, and means for rendering any one of said escapements effective with said keys.

51. In a typewriting machine, the combination with a carriage, of a plurality of type-sets, a single set of keys, a plurality of carriage escapements, one for each type-set, and means for rendering any one of said type-sets and the escapement associated therewith effective with said keys.

52. In a typewriting machine, the combination with a carriage, of a plurality of type-sets, and a plurality of escapements, one set and one escapement being effective at a time, the effective set and the effective escapement being dependent upon the position of the carriage.

53. In a typewriting machine, the combination with a carriage and a rack thereon, of a plurality of escapements, one being effective at a time, the effective one being dependent upon the position of the carriage and the rack engaging therewith.

54. In a typewriting machine, the combination with a carriage, of a plurality of sets of type-bars, a plurality of universal bars, one for each set of type-bars, and a single set of keys, said keys being adapted to actuate any one of said universal bars, through the intermediary of the associated set of type-bars.

55. In a typewriting machine, the combination with a carriage, of a plurality of type-sets, a universal bar for each type-set, an escapement for each universal bar, a rack on said carriage which may engage with any one of said escapements, but only one at a time, and a single set of keys, said carriage being movable into effective relation with any one of said escapements, and said carriage when so moved being effective to connect said set of keys with the type-set associated with the effective escapement, said keys being effective to actuate the universal bar and escapement associated with the effective type-set.

56. In a typewriting machine, the combination with a platen, of a plurality of type-sets, a plurality of escapements, one for each type-set, said platen being movable into effective relation with any one of said type-sets, and means for rendering any one of said escapements effective when said platen is moved into effective relation with the associated type-set.

57. In a typewriting machine, the combination with a carriage, of a single set of keys, carriage-feeding devices including a plurality of universal bars, and means for rendering any one of said universal bars effective with said keys.

58. In a typewriting machine, the combination with a carriage, of a plurality of type-sets, a single set of keys, escapement devices, a plurality of universal bars, one for each type-set, and means for rendering any one of said type-sets and the universal bar associated therewith effective with said keys.

59. In a typewriting machine, the combination with a carriage, of a plurality of type-sets, a universal bar for each type-set, an escapement associated with each universal bar, a single set of keys, one type-set being effective to be operated by said keys at a time, the effective set being dependent upon the position of the carriage, and a rack on said carriage engaging with one of said escapements at a time.

60. In a typewriting machine, the combination with a carriage, of a plurality of type-sets, a universal bar for each type-set, an escapement associated with each universal bar, a single set of keys, and means controlled from the carriage for connecting said set of keys with any one of said type-sets, said keys being adapted, through the intermediary of any one of said type-sets, to actuate the universal bar and escapement associated therewith.

61. In a typewriting machine, the combination of a plurality of sets of type-bars, a universal bar for each set of type-bars and coöperating therewith, each universal bar having an escapement actuated thereby, a single set of keys, and means for rendering said set of keys effective to actuate any one of said sets of type-bars to actuate the associated universal bar and the escapement associated with the latter.

62. In a typewriting machine, the combination with a carriage comprising a platen, printing instrumentalities and a ribbon, of a plurality of escapements, a plurality of universal bars, one for each escapement, and ribbon-feeding mechanism, said ribbon-feeding mechanism being operable by any one of said universal bars.

63. In a typewriting machine, the combination with a carriage comprising a platen, printing instrumentalities and a ribbon, of a plurality of escapements, a plurality of universal bars, one for each escapement, ribbon-feeding mechanism, said ribbon-feeding mechanism being operable with either one of said universal bars, and means for rendering said ribbon-feeding mechanism under the control of any one of said universal bars.

64. In a typewriting machine, the combination with a carriage comprising a platen, printing instrumentalities and a ribbon, of a plurality of escapements, a plurality of universal bars, one for each escapement, ribbon-feeding mechanism, said ribbon-feeding mechanism being operable by any one of said universal bars, and means for rendering said ribbon-feeding mechanism under the control of any one of said universal bars, said means being controlled from said carriage.

65. In a typewriting machine, the combination with a ribbon and a carriage comprising a platen, of two sets of printing instrumentalities, a plurality of universal bars, one for each set of printing instrumentalities, and ribbon-feeding mechanism, said ribbon-feeding mechanism being operable by either one of said universal bars.

66. In a typewriting machine, the combination with a ribbon and a carriage comprising a platen, of two sets of type-bars, a plurality of universal bars, one for each set of type-bars, ribbon-feeding mechanism, said ribbon-feeding mechanism being operable by either one of said universal bars, and means for rendering said ribbon-feeding mechanism under the control of either set of type-bars.

67. In a typewriting machine, the combination with a carriage comprising a platen, printing instrumentalities and a ribbon, of a plurality of universal bars, ribbon-feeding mechanism, said ribbon-feeding mechanism being operable by any one of said universal bars, and means for connecting said ribbon-feeding mechanism to any one of said universal bars, said means being controlled from said carriage.

68. In a typewriting machine, the combination with a ribbon and a carriage comprising a platen, of a plurality of sets of printing instrumentalities, a plurality of universal bars, one for each set of printing instrumentalities, ribbon-feeding mechanism, said ribbon-feeding mechanism being operable with either one of said universal bars, and means for shifting said ribbon-feeding mechanism under the control of any one of said universal bars, by causing a relative shifting movement between the carriage and the sets of printing instrumentalities.

69. In a typewriting machine, the combination with a carriage comprising a platen, of a plurality of type-sets arranged side by side, said platen being movable laterally into effective relation with any one of said type-sets, a plurality of universal bars, one for each type-set, ribbon-feeding mechanism, and means controlled by the carriage for connecting said ribbon-feeding mechanism with the universal bar associated with the type-set to which the platen is being moved.

70. In a typewriting machine, the combination with a ribbon and a carriage comprising a platen, of a plurality of type-sets, a single set of keys, a plurality of universal bars, one for each type-set, ribbon-feeding mechanism, and means for connecting said keys with any one of said type-sets to render it effective, and for rendering said ribbon-feeding mechanism effective with the universal bar associated with the effective type-set.

71. In a typewriting machine, the combination with a ribbon and a carriage comprising a platen, of a plurality of sets of type-bars, a plurality of sets of sub-levers, one set for each set of type-bars, a single set of keys, a plurality of universal bars, one for each set of type-bars, a plurality of sets of interponents, a bail associated with said interponents, ribbon-feeding mechanism, and means for moving said bail to shift said interponents to connect a different set of sub-levers to said keys, said means being also effective to connect said ribbon-feeding mechanism with the universal bar associated with the effective set of type-bars.

72. In a typewriting machine, the combination with a ribbon and a carriage comprising a platen, of a plurality of type-sets, a single set of keys, a plurality of universal bars, one for each type-set, ribbon-feeding mechanism, and means, actuable by a movement of said carriage from one type-set to another, for connecting said keys with any type-set to render the latter effective, and for connecting said ribbon-feeding mechanism with the universal bar associated with the effective type-set.

73. In a typewriting machine, the combination with a ribbon and a carriage comprising a platen, of a plurality of type-sets, a plurality of universal bars, one for each type-set, ribbon-feeding mechanism, said ribbon-feeding mechanism being operable by either one of said universal bars, a plurality of ribbon vibrators, one for each universal bar, means for rendering any one of said type-sets effective, and means for connecting said ribbon-feeding mechanism to one of said universal bars while one of said type-sets is being rendered effective.

74. In typewriting machine, the combination of a ribbon-feeding mechanism, a plurality of universal bars, and means for actuating said ribbon-feeding mechanism from either one of said universal bars.

75. In a typewriting machine, the combination with a plurality of type-sets, of a carriage, a single set of keys, key-actuated means for actuating any one of said type-sets, and carriage-actuated means for rendering said key-actuated means ineffective for actuating one of said type-sets, and effective for actuating another.

76. In a typewriting machine, the combination of a ribbon-feeding mechanism, two escapements, means for actuating said ribbon-feeding mechanism, said means comprising a shaft, and interponents on said shaft, each interponent being associated with one of the escapements, the connection between said interponents and said shaft being such that they can positively move said shaft in one direction only.

77. In a typewriting machine, the combination of a ribbon-feeding mechanism, two escapements, and means for actuating said ribbon-feeding mechanism, said means comprising two interponents associated with said escapements, one of said escapements being effective to actuate said ribbon-feeding mechanism through the intermediary of one of said interponents without disturbing the other interponent.

78. In a typewriting machine, the combination with a platen, of a plurality of independently actuable type-sets comprising type-bars, each having an upper and a lower-case character thereon, a single set of keys, means to connect said single set of keys with any one of said type-sets, said platen being movable into effective relation with any one of said type-sets, and case-shifting means which may be actuated when the platen is in effective relation with any one of said type-sets.

79. In a typewriting machine, the combination of a plurality of type-sets, each set comprising individually movable members carrying upper and lower-case types, and each set of types having a different style of print, a single set of keys, means actuated by said single set of keys for severally moving to printing position the movable members of each of said sets, case-shifting means, and means for changing the connections between said keys and said type-sets and thereby changing the style of print.

80. In a typewriting machine, the combination with a platen, of a plurality of independently actuable type-sets, actuating means for said type-sets operated by a single set of keys, said platen being movable into effective relation with any one of said type-sets, and case-shift mechanism comprising a single shift frame which may be actuated to shift the platen when it is in effective relation with any one of said type-sets.

81. In a typewriting machine, the combination with a platen, of a plurality of type-sets arranged side by side, said platen being movable into effective relation with any one of said type-sets, a single keyboard, case-shift mechanism comprising a single shift frame, and a key in said keyboard for actuating said shift frame to shift the platen when it is in effective relation with any one of said type-sets.

82. In a typewriting machine, the combination with a platen, of a plurality of type-sets, a plurality of universal bars, one for each type-set, a plurality of ribbon vibrators, one for each universal bar, said platen being movable into effective relation with any one of said type-sets, and case-shift mechanism comprising a single shift frame which may be actuated to shift the platen when it is in effective relation with any one of said type-sets, said ribbon vibrators being associated with said shift frame.

83. In a typewriting machine, the combination with a carriage, of a plurality of escapements for feeding said carriage, a space-bar, and means for rendering said space-bar effective with any one of said escapements.

84. In a typewriting machine, the combination with a carriage, of a plurality of escapements for feeding said carriage, a space-bar, and means, controlled by a movement of said carriage, for rendering said space-bar effective with any one of said escapements.

85. In a typewriting machine, the combination with a carriage, of a plurality of escapements for feeding said carriage, a space-bar, a plurality of interponents between said space-bar and escapements, and means controlled by said carriage for shifting said interponents to render said space-bar effective with any one of said escapements.

86. In a typewriting machine, the combination with a carriage, of a plurality of escapements for feeding said carriage, a space-bar, a plurality of interponents between said space-bar and escapements, a sleeve connecting said interponents, a shaft on which said sleeve is slidable, and means controlled by said carriage for sliding said sleeve on said shaft to change the relation between said interponents and said space-bar to render any one of said escapements effective.

87. In a typewriting machine, the combination with a platen, of a plurality of type-sets, a single set of keys, and means actuated when the platen is moved from one type-set to another for connecting said keys to the type-set to which the platen is moved.

88. In a typewriting machine, the combination with a platen, of a plurality of type-sets, a single set of keys, and means actuated by a relative movement between said platen and said type-sets to connect said keys with any one of said type-sets.

89. In a typewriting machine, the combination with a platen, of a plurality of type-sets arranged side by side, a single set of keys, and means whereby a relative lateral movement between said type-sets and said platen may cause an effective relation of said keys with any one of said type-sets.

90. In a typewriting machine, the combination with a platen, of a plurality of type-sets, and a ribbon-vibrator for each set, one set and one ribbon-vibrator being effective at a time, the effective set and effective ribbon-vibrator being dependent upon the position of the platen.

91. In a typewriting machine, in combination, a platen, two sets of type-bars arranged side by side, each set of type-bars having a separate printing point, a single set of keys, and means for connecting said keys with said sets of type-bars alternatively.

92. In a typewriting machine, the combination with a platen, of a plurality of type-sets, each set having an escapement, and a ribbon-vibrator associated therewith, one type-set, one escapement, and one ribbon-vibrator being effective at a time, the effective set of types, escapement and ribbon-vibrator being dependent upon the position of the platen.

93. In a typewriting machine, in combination, a platen, a plurality of type-sets having separate printing points, a single set of keys, and means for selectively determining the type-sets to be actuated by said keys.

94. In a typewriting machine, the combination with a platen, of a plurality of type-sets, and a plurality of escapements, one set and one escapement being effective at a time, the effective set and the effective escapement being dependent upon the position of said platen.

95. In a typewriting machine, the combination with a platen, printing instrumentalities, and a ribbon, of a plurality of escapements, a plurality of universal bars, one for each escapement, ribbon-feeding mechanism, said ribbon-feeding mechanism being operable by any one of said universal bars, and means for rendering said ribbon-feeding mechanism under the control of any one of said universal bars, said means being controlled by the relative positions of said platen and printing instrumentalities.

96. In a typewriting machine, the combination with a platen, of a plurality of type-sets comprising type-bars, each having an upper and a lower-case character thereon, a single set of keys, means to connect said single set of keys with any one of said type-sets, means whereby said platen and any one of said type-sets may be brought into coöperative relation, and case-shifting means effective when the platen is in effective relation with any one of said type-sets.

97. In a typewriting machine, the combination with a platen, of a plurality of type-sets spaced transversely of the machine, means whereby said platen and any one of said type-sets may be brought into coöperative relation, a single keyboard, case-shift mechanism comprising a single shift frame, and a key in said keyboard for actuating said shift frame to shift the platen when it is in effective relation with any one of said type-sets.

98. The combination with a platen, of a plurality of sets of type-bars, each type-bar having a plurality of types thereon, a single set of keys, means, including a controlling element for operatively connecting said single set of keys with any one of said sets, means for effecting a relative shifting movement between said sets of type-bars and said element to determine the set of type-bars with respect to which said keys are to be effective, and case-shifting means for rendering effective different types on said type-bars.

99. In a typewriting machine, the combination with a plurality of type-sets, of a single set of keys, key-actuated means for operating any one of said type-sets, mechanism tending to render said key-actuated means ineffective with respect to one of said type-sets, and effective with respect to another, and means including a carriage for controlling said mechanism.

100. In a typewriting machine, the combination with a platen, of a plurality of type-sets spaced transversely of the machine, a single set of keys, means whereby said platen and any one of said type-sets may be brought into effective relation, and means for effecting operative connection between said single set of keys and either of said type-sets.

JOHN WALDHEIM.

Witnesses:
 EDITH B. LIBBEY,
 CATHERINE A. NEWELL.